US006300750B1

(12) United States Patent
Oglesbee et al.

(10) Patent No.: US 6,300,750 B1
(45) Date of Patent: Oct. 9, 2001

(54) SHUNT VOLTAGE REGULATOR WITH SELF-CONTAINED THERMAL CROWBAR SAFETY PROTECTION

(75) Inventors: John W. Oglesbee, Watkinsville, GA (US); Greg J. Smith, Tuscon, AZ (US)

(73) Assignees: National Semiconductor Corporation, Santa Clara, CA (US); Motorola, Inc., Schaumberg, IL (US)

(*) Notice: Subject to any disclaimer, the term of this patent is extended or adjusted under 35 U.S.C. 154(b) by 0 days.

(21) Appl. No.: 09/545,135

(22) Filed: Apr. 7, 2000

(51) Int. Cl.[7] .......... G05F 1/40

(52) U.S. Cl. .......... 323/282

(58) Field of Search .......... 323/266, 273, 323/274, 279, 282, 284, 285

(56) References Cited

U.S. PATENT DOCUMENTS 4,544,876 * 10/1985 Bailey et al. .......... 323/282
4,862,013 * 8/1989 Konopka .......... 307/254
5,844,399 * 12/1998 Stuart .......... 320/31
5,898,296 * 4/1999 Maddox et al. .......... 323/282
5,932,938 * 8/1999 Shimamori .......... 307/125
6,046,575 4/2000 Demuro .

FOREIGN PATENT DOCUMENTS

WO 99/39421 8/1999 (WO) .

* cited by examiner

*Primary Examiner*—Matthew Nguyen
(74) *Attorney, Agent, or Firm*—Needle & Rosenberg, P.C.

(57) ABSTRACT

A voltage regulator that includes a voltage control circuit, fabricated on a semiconductor. The voltage control circuit maintains a voltage between a first node and a second node within a predetermined range by maintaining a current level flowing from the first node to the second node. The current level is a function of a voltage between a third node and the second node. A thermal sensing circuit is also fabricated on the semiconductor and is thermally coupled to the voltage control circuit. The thermal sensing circuit asserts a latch signal that causes the voltage control circuit to allow a saturation value of current to flow from the first node to the second node when the thermal sensing circuit senses that the voltage control circuit has reached a temperature above a predetermined threshold.

25 Claims, 4 Drawing Sheets

SHUNT VOLTAGE REGULATOR WITH SELF-CONTAINED THERMAL CROWBAR SAFETY PROTECTION

BACKGROUND OF THE INVENTION

1. Field of the Invention

The present invention relates to battery protection circuits and, more specifically, to a voltage regulator for regulating charging to a battery.

2. Description of the Prior Art

Overcharging is a universal issue that must be addressed when designing battery protection circuits. Lithium based batteries, including Lithium-Ion batteries and Lithium-Polymer batteries tend to be sensitive to excessive voltage. Without a suitable safety circuit overcharging could compromise battery reliability.

To improve reliability, several chargers and battery packs include devices that bypass the battery charging current when charging becomes excessive. Such devices detect excessive charging and, when detected, reroute the charging current through a shunt circuit. One such device is a "Zener-fuse" circuit, as shown in FIG. 1. In this circuit, a zener diode 106 begins conducting in the reverse-biased, or "avalanche," mode when the voltage from the power supply/charger 102 exceeds the normal charging voltage of the battery cells 104. Once the zener diode 106 is in avalanche mode, it acts somewhat like a short circuit relative to the power supply/charger 102. The avalanche condition causes current to increase rapidly which, in turn, causes the fuse 108 to clear, isolating the battery cells 104 from the power supply/charger 102.

The problem with this circuit is that, in reality, the zener diode 106 is not a pure short. In avalanche mode, there is actually a voltage across the zener diode 106, causing it to dissipate power. The high current required to clear the fuse also rapidly heats the zener diode 106. Thus, a "thermal race" condition exists between the zener diode 106 and the fuse 108. As both the fuse 108 and the zener diode 106 being degraded by excess heat, the zener diode 106 must experience degradation slower than the fuse 108 in order for the fuse 108 to safely clear. Therefore a zener diode 106 with a high power rating must be used to ensure that the fuse 108 clears before the zener diode 106 reaches a temperature high enough to cause it to fail. These high power zener diodes are often big, bulky and expensive.

There is therefore a need for a small, reliable, inexpensive circuit to protect against overcharging in battery cells.

DETAILED DESCRIPTION OF THE INVENTION

Figure 1:
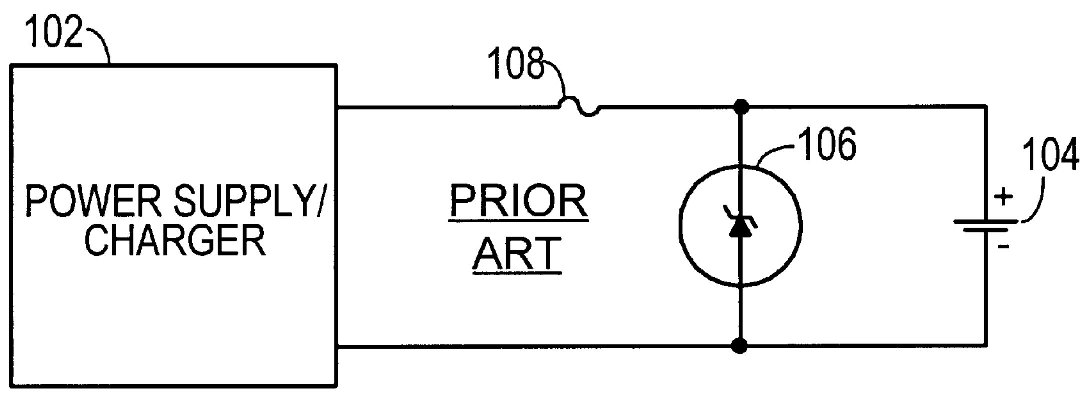
FIG. 1 is a schematic diagram of a prior art circuit.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Also, "battery" includes single cell batteries and multiple cell batteries.

The disclosure that follows hereby incorporates by reference U.S. patent application Ser. No. 60/073279 and PCT Patent Application Serial No. PCT/US99/01911.

In one embodiment, the invention is a voltage regulator used to prevent overcharging of a battery in situations in which the battery is subjected to unusually high voltages. The voltage regulator employs a voltage control circuit that keeps the voltage across the nodes of the battery within a desired range. It does this by adjusting a current that bypasses the battery. For example, when an unusually high voltage is detected across the battery, the voltage regulator increases the current bypassing the battery, thereby reducing the voltage across the battery. A thermal sensing circuit senses when the temperature of the voltage regulator is above a maximum desired temperature and causes the voltage regulator to increase the amount of current bypassing the battery when the temperature is too high. The voltage regulator may be fabricated on a semiconductor, thereby making it relatively inexpensive and small enough to include in a variety of battery and battery charging applications.

Figure 2:
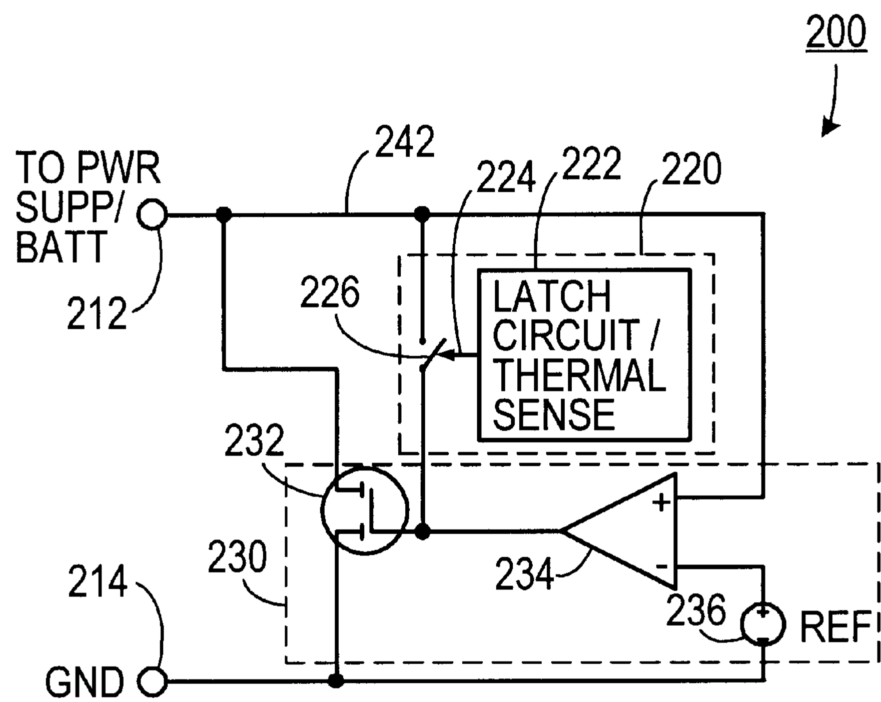
FIG. 2 is a schematic diagram of a circuit in accordance with one embodiment of the invention.

As shown in FIG. 2, the invention is a voltage regulator 200 that includes a voltage control circuit 230 and a thermal sensing circuit 220, both fabricated on a semiconductor. The voltage control circuit 230 maintains a voltage between a first node 212 and a second node 214 within a predetermined range (for example, 4.5 V in the case of the regulator being used in association with a lithium ion battery charger) by maintaining a current level flowing from the first node 212 to the second node 214. The current level is a function of a voltage between a selected node (e.g., the first node 212) and the second node 214. The thermal sensing circuit 220 is also fabricated on the semiconductor and is thermally coupled to the voltage control circuit 230. The thermal sensing circuit 220 includes a latch circuit/thermal sensor 222 that asserts a temperature-dependant control signal 224 when the latch circuit/thermal sensor 222 senses that the voltage control circuit 230 has reached a temperature above a predetermined threshold. The asserted signal 224 causes the voltage control circuit 230 to allow a saturation value of current to flow from the first node 212 to the second node 214. A switch 226, responsive to the latch signal 224, electrically couples the first node 212 to the controlling gate of the transistor 232 when the control signal 224 is asserted, thereby forcing the transistor 232 into a maximally conductive state between the first port 212 and the second port 214. Thus the invention acts as a shunt voltage regulator with self-contained thermally activated crowbar safety protection.

In one embodiment, the voltage control circuit 230 includes a transistor 232 (such as a metal oxide semiconductor field effect transistor) having a first pole electrically coupled to the first node 212, a second pole electrically coupled to the second node 214 and a gate. The transistor 232 is capable of controlling an electrical current flowing from the first node 212 to the second node 214 as a function of a voltage at its gate, which is also referred to herein as a controlling port. A voltage reference 236 generates a signal that has a predetermined potential difference from the second node 214. An amplifier 234, having a first input electrically coupled to the first node 212 and a second input electrically coupled to the signal from the voltage reference 236, generates an output electrically coupled to the gate of the transistor 232. The output of the amplifier 234 is thus a function of a voltage difference between the first node 212 and the second node 214.

Figure 3A:
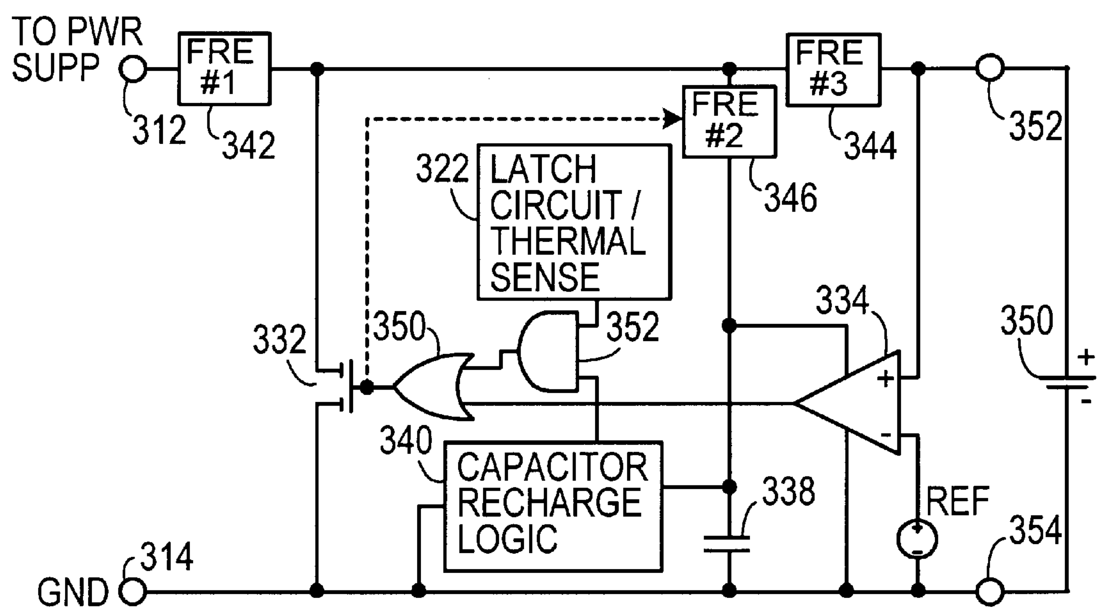
FIG. 3A is a schematic diagram of an alternate embodiment of a circuit according to the invention.

In another embodiment, as shown in FIG. 3A, a battery cell 350, having a first terminal 352 and a second terminal 354 is coupled to the circuit. Thus, the circuit is capable of providing over voltage protection to the battery cell 350 as part of a recharging circuit.

Additional elements may be added to the circuit to add certain features. For example, to ensure that the power transistor 332 conducts continuously, a capacitor 338 may be placed across the power inputs to the amplifier 334. The capacitor is normally charged to a level sufficient to power the amplifier 334 for a predetermined time, so that the amplifier 334 continues to produce a voltage even when current is being dumped through the transistor 332. If the capacitor 338 were not included, when the power transistor 332 began conducting, the voltage across the amplifier 334 power inputs would drop to the point where the power transistor 332 would cease conducting. When capacitor 338 is employed and when charge on the capacitor 338 is depleted to the point where the amplifier 334 cannot drive the power transistor 332, the power transistor 332 will momentarily cease conducting. This allows current to flow to the capacitor 338, thereby recharging it. Because the capacitor 338 charges much faster than it discharges while driving the amplifier 334 (typically, the charging duty cycle is about five microseconds charging per second discharging), the power transistor 332 will conduct for relatively long periods that are interrupted by brief periods during which the capacitor 338 is recharged.

In one embodiment, a capacitor recharge logic circuit 340 is be provided to sense when the capacitor 338 requires recharging and to provide recharging current when the need is sensed. The capacitor recharge logic circuit 340 may also provide controlling input to drive the transistor 332. In one such embodiment, an output of the capacitor recharge logic circuit 340 is AND'ed 352 with the output of the latch circuit 322, the result of which is then OR'ed 350 with the output of the amplifier 334. The OR'ing function 350 may be an "analog OR" so that is the output of the AND'ing function 352 is a logical zero, then the output of the amplifier 334 drives the transistor 332, but when the output of the AND'ing function 352 is a logical one, the transistor 332 is driven to the maximally conductive state. In this embodiment, when an over-temperature condition exists and when the capacitor 338 is not being recharged by the capacitor recharge logic 340, then the output of the AND function is a logic one and the transistor 332 is driven to the "on" state. When the capacitor 338 needs recharging, the capacitor recharge logic 340 drives the output of the AND function 352 to a zero and the output of the amplifier 334 is passed through to drive the transistor 332, thereby allowing node 312 to raise toward regulation voltage and current to flow to the capacitor 338 until it is properly charged, at which time the capacitor recharge logic 340 stops the recharge operation and drives the transistor 332 back into the "ON" condition.

Figure 3B:
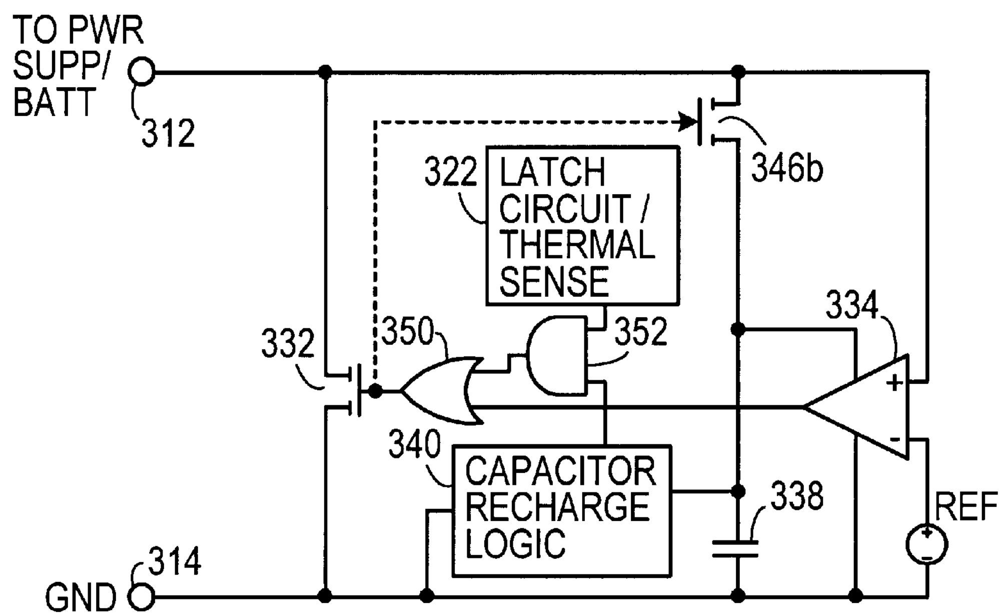
FIG. 3B is a schematic diagram of an alternate embodiment of a circuit according to the invention.
Figure 3C:
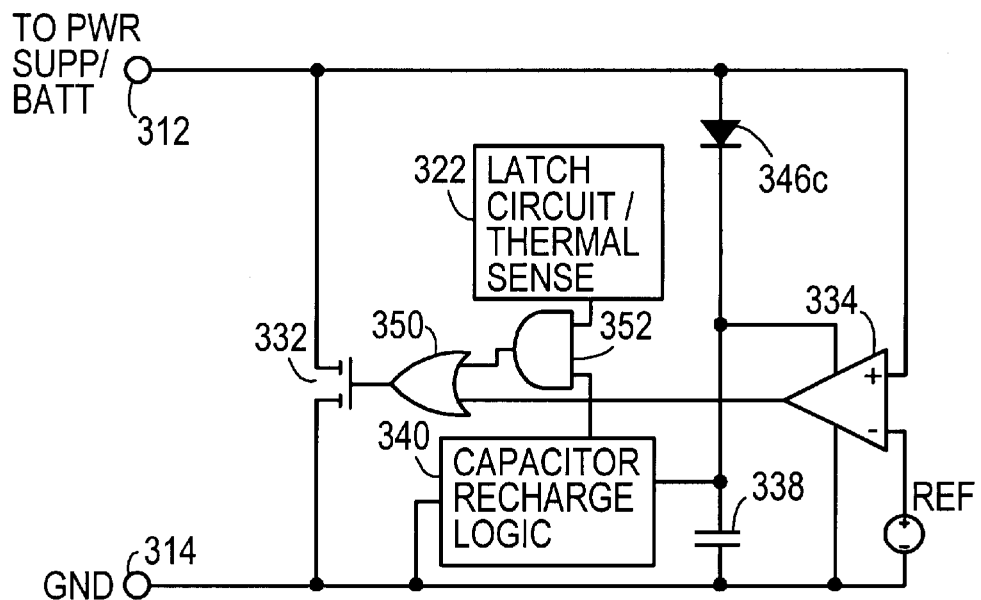
FIG. 3C is a schematic diagram of an alternate embodiment of a circuit according to the invention.

One or more flow restricting elements 342, 344 & 346 may be provided to increase reliability of the circuit. The flow restricting elements 342, 344 & 346 may include, for example, fuses, transistors, switches, diodes or positive temperature coefficient devices. In the embodiment of FIG. 3B, the second flow restricting element 346*b* is a transistor that is controlled by the output of the OR function 350. Thus, when transistor 332 is driven to the "ON" state, transistor 346*b* is driven to a substantially non-conducting state, thereby preventing the capacitor 338 from discharging through transistor 332. When transistor 332 is in the "OFF" state, transistor 346*b* is allowed to conduct, thereby allowing the capacitor 338 to recharge. As shown FIG. 3C, the second flow restricting element 346*c* may be a diode that is biased to allow current to flow into the capacitor 338 but not to flow out of from the capacitor 338. This embodiment, while simple, involves a forward bias voltage drop across the diode 346*c*.

Figure 3D:
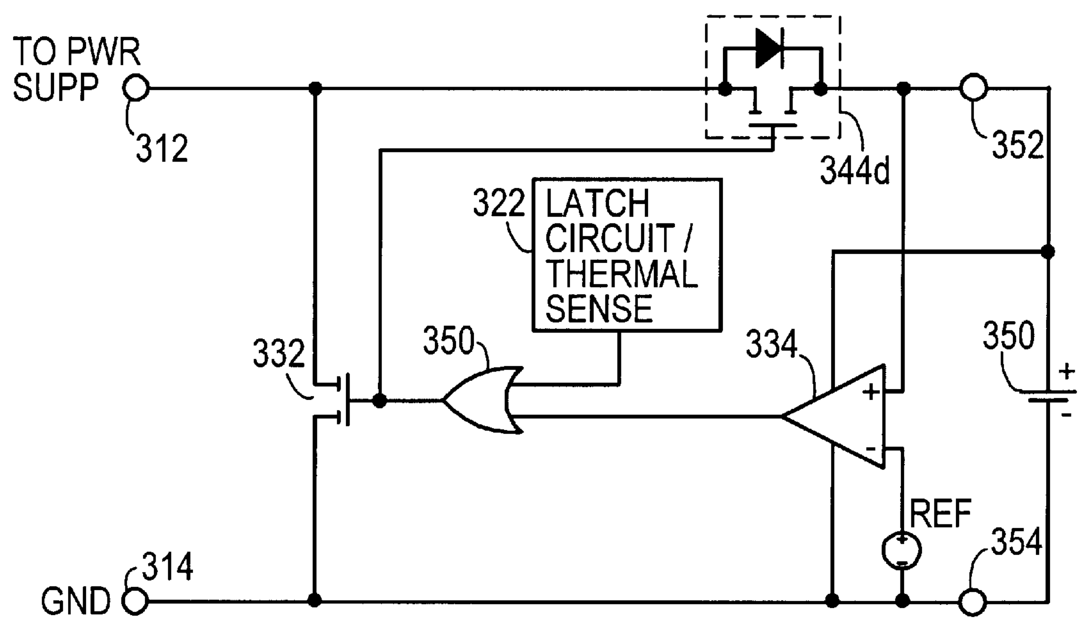
FIG. 3D is a schematic diagram of an alternate embodiment of a circuit according to the invention.

As shown in FIG. 3D, in one embodiment, the output of the cell 350 is used to power the amplifier 334 and the third flow restricting element 344*d* is a transistor that is biased so that its inherent parasitic diode allows current flow into the cell 350, but no current flow out of the cell 350 when the transistor 344*d* is in the "OFF" state. The transistor 344*d* is driven to the "OFF" state when transistor 332 is conducting. This prevents the cell 350 from discharging, thereby allowing the cell 350 to power the amplifier 334 and eliminating a need for the capacitor of the above-described embodiments. Transistor 344*d* may also be driven to the "ON" state, in which case the cell 350 is allowed to power a load.

Although it will be understood that many different permutations of the first, second and third flow restricting elements 342, 344 and 346 shown in FIG. 3A are possible, several such permutations are shown in the table below. The decision as to which permutation to be used would be based on several factors relative to the specific application, including cost requirements, power requirements and space available, as would be readily known to one of skill in the art of electronic circuit design.

| F.R.E. #1 | F.R.E. #2 | F.R.E. #3 | CAPACITOR LOGIC |
|---|---|---|---|
| Short | Diode | Short | Present |
| Short | Transistor | Short | Present |
| Short | Open (Power from Cell) | Transistor | None |
| Fuse | Open (Power from Cell) | Transistor | None |
| Fuse | Diode | Fuse | Present |
| Fuse | Transistor | Fuse | Present |
| Short | Diode | Fuse | Present |
| Short | Transistor | Fuse | Present |
| Fuse | Diode | Short | Present |
| Fuse | Transistor | Short | Present |
| Transistor | Diode | Short | Present |
| Transistor | Transistor | Short | Present |

The circuit may be designed to be resettable when certain temporary fault conditions occur. For example, with a "key chain fault" that occurs when a battery is placed in a pocket or purse and is shorted by a user's key, the capacitor 338 maintains charge on the amplifier 334, thereby preventing damage to the battery 350. Once the key is removed, however, the invention will reset itself and allow the battery to operate normally. Even with an embodiment employing a fuse (as discussed below with FIG. 4) the invention may allow for continued use in such situations where there is a low voltage sustained surge that does not quite deliver enough current to exceed the fuse current, but that would otherwise reduce reliability of the battery.

Figure 4A:
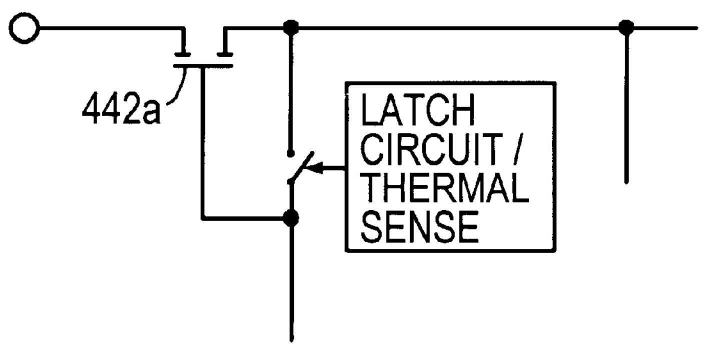
FIG. 4A is a schematic diagram of an embodiment of a flow-restricting element.

As shown in FIG. 4A, one embodiment of the invention employs a first flow restricting element that comprises a transistor 442*a* that is controlled by the thermal sensing circuit. The transistor 442*a* is biased so that current is allowed to flow through the transistor 442*a* when the temperature is below the temperature threshold of the latch circuit/thermal sensor and current is restricted by the transistor 442*a* when the temperature rises above the threshold. This embodiment allows normal battery discharge, while protecting against battery current dumping in an over threshold temperature condition.

Figure 4B:
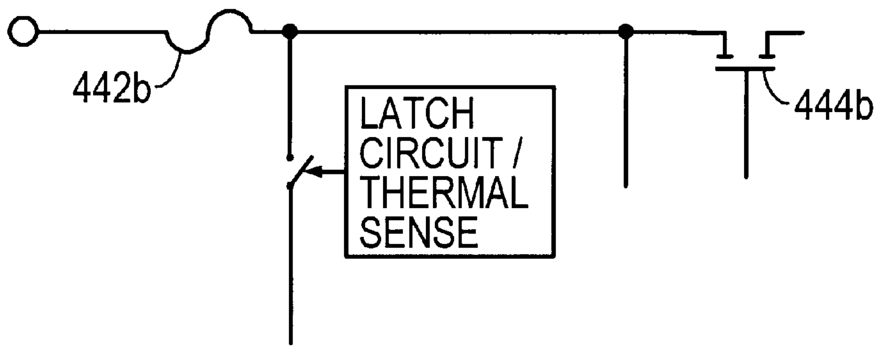
FIG. 4B is a schematic diagram of an alternate embodiment of a flow-restricting element.
Figure 4C:
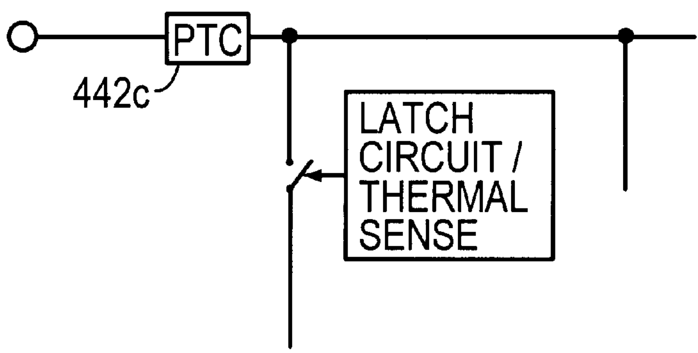
FIG. 4C is a schematic diagram of a second alternate embodiment of a flow-restricting element.

In another embodiment, as shown in FIG. 4B, the first flow-restricting element comprises a fuse 442*b* that creates an open circuit when current flowing therethrough is above a predetermined value. This is an inexpensive alternative, but it results in an opened fuse 442*b* that may require replacement if an over limit discharge occurs. Also, as shown in FIG. 4C, in one embodiment, the first flow restricting element may be a positive temperature coefficient device.

The invention may be embodied as a single, self-contained two terminal or three terminal device (or more terminals), thereby allowing it to be manufactured at low cost and, thus, be included in many power applications where cost is an important consideration. Such applications include: batteries, battery chargers and any application where a temperaturesensitive voltage regulator is indicated. Being fabricated on a single integrated circuit, the invention takes up relatively little space, thereby allowing it to be used in many applications in which space limitations are an important consideration (e.g., cell phones, cell phone batteries, pagers, etc.). As would be known to those of skill in the art, the invention may be embodied using discrete components by sacrificing some of the cost and size advantages of the single integrated circuit embodiment. Depending upon the actual circuit technology employed in the specific implementation of the invention, the disclosed embodiment can handle fault currents in excess of 20 amps.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described.

What is claimed is:

1. A voltage regulator for regulating charging current to a battery, the battery having a first terminal and a second terminal, the voltage regulator comprising:

a. a transistor, having a first port that is electrically coupled to a first node, a second port that is electrically coupled to a second node and a control port, the first terminal being electrically coupled to a third node, the second port being electrically coupled to the second terminal, the transistor capable of controlling an electrical current flowing from the first node to the second node as a function of a voltage at the control port;

b. an amplifier having an output that is electrically coupled to the control port of the transistor, the amplifier capable of placing a voltage at the control port that is a function of a voltage difference between the first terminal and the second terminal;

c. a thermal sensing circuit capable of sensing a temperature of the transistor, that asserts a temperature-dependant control signal when the temperature is above a predetermined threshold; and d. a switch, responsive to the temperature-dependant control signal, that electrically couples the first node to the control port when the temperature-dependant control signal is asserted, thereby forcing the transistor into a maximally conductive state between the first port and the second port.

2. The voltage regulator of claim 1, wherein the transistor is a field effect transistor.

3. The voltage regulator of claim 1, further comprising a first flow restricting element that electrically couples the first terminal to the first node.

4. The voltage regulator of claim 3, wherein the first flow restricting element is a component selected from the group consisting of: fuse, transistor, switch, diode and positive temperature coefficient device.

5. The voltage regulator of claim 1, further comprising a capacitor that receives charge from a current source and that is capable of delivering charge to a power input of the amplifier.

6. The voltage regulator of claim 5, wherein the capacitor has a capacitance sufficient to maintain a driving charge on the amplifier for a preselected period of time.

7. The voltage regulator of claim 5, further comprising a capacitor recharge logic circuit that is capable of sensing when the capacitor voltage is less than a minimum voltage required to drive the amplifier and is capable of delivering charge to the capacitor when the capacitor voltage is less than the minimum voltage required to drive the amplifier.

8. The voltage regulator of claim 7, wherein the switch comprises an AND gate that is responsive to the capacitor recharge logic circuit and to the thermal sensing circuit, wherein the AND gate drives the transistor to the maximally conducting state when the temperature-dependant control signal is asserted and when the capacitor recharge logic circuit is not recharging the capacitor and wherein the AND gate drives the transistor to a minimally conductive state when the temperature-dependant control signal is asserted and when the capacitor recharge logic circuit is recharging the capacitor.

9. The voltage regulator of claim 8, further comprising an OR gate that is responsive to the AND gate and the output of the amplifier, the OR gate having an output that drives the control gate of the transistor, so that if the AND gate does not generate a voltage sufficient to drive the transistor, then the transistor is driven by the output of the amplifier and so that if the AND gate does generate a voltage sufficient to drive the transistor then the transistor is driven to the maximally conductive state.

10. The voltage regulator of claim 7, further comprising a second flow restricting element that is capable of selectively coupling the capacitor to the first node.

11. The voltage regulator of claim 10 wherein a switch control signal causes the second flow restricting element to restrict current flow therethrough when the transistor is in the maximally conductive state.

12. The voltage regulator of claim 11 wherein the second flow restricting element is a component selected from the group consisting of: fuse, transistor, switch, diode and positive temperature coefficient device.

13. The voltage regulator of claim 1, further comprising a second flow restricting element that is capable of selectively coupling a power input of the amplifier to the first node.

14. The voltage regulator of claim 13, wherein the second flow restricting element is a component selected from the group consisting of: fuse, transistor, switch, diode and positive temperature coefficient device.

15. The voltage regulator of claim 1, further comprising a third flow-restricting element that limits current flow from the first node to the third node.

16. The voltage regulator of claim 15, wherein the third flow-restricting element comprises a diode biased to allow current to flow only from the first node to the third node.

17. The voltage regulator of claim 15, wherein the third flow-restricting element comprises a fuse that creates an open circuit when current flowing therethrough is above a predetermined value.

18. The voltage regulator of claim 15, wherein the third flow-restricting element comprises a transistor that is biased so as to allow current to flow from the first terminal to the first node when the temperature-dependant control signal is not asserted and so as not to allow current to flow from the first terminal to the first node when the temperature-dependant control signal is asserted.

19. The voltage regulator of claim 15, wherein the third flow restricting element is a component selected from the group consisting of: fuse, transistor, switch, diode and positive temperature coefficient device.

20. The voltage regulator of claim 7, wherein the first node is shorted to the third node.

21. A voltage regulator, comprising:

a. a voltage control circuit, fabricated on a semiconductor, that maintains a voltage between a first node and a second node within a predetermined range by maintaining a current level flowing from the first node to the second node, the current level being a function of a voltage at a preselected node in the voltage control circuit, wherein the voltage control circuit comprises:

a transistor having a first pole electrically coupled to the first node, a second pole electrically coupled to the second node and a gate;

a voltage reference that generates a signal having a predetermined potential difference from the second node; and an amplifier having a first input electrically coupled to the preselected node, a second input electrically coupled to the signal from the voltage reference and an output electrically coupled to the gate of the transistor; and b. a thermal sensing circuit, also fabricated on the semiconductor, thermally coupled to the voltage control circuit, that asserts a temperature-dependant control signal that causes the voltage control circuit to allow a saturation value of current to flow from the first node to the second node when the thermal sensing circuit senses that the voltage control circuit has reached a temperature above a predetermined threshold.

22. The voltage regulator of claim 21, adapted so as to be coupled to a battery cell, having a first pole and an oppositely charged second pole, wherein the first pole is electrically coupled to a third node and the second pole is electrically coupled to the second node, the voltage regulator further comprising a flow-restricting element, electrically coupling the first node and the third node, that prevents current flowing from a battery cell to the second node through the voltage control circuit when the voltage control circuit is allowing a saturation value of current to flow from the first node to the second node.

23. The voltage regulator of claim 22, wherein the flow-restricting element comprises a diode biased to allow current to flow only from the first node to the third node.

24. The voltage regulator of claim 22, wherein the flow-restricting element comprises a fuse that creates an open circuit when current flowing therethrough is above a predetermined value.

25. The voltage regulator of claim 22, wherein the flow-restricting element comprises a transistor that exhibits properties of a parasitic diode, wherein a portion of the transistor that represents an anode is electrically coupled to the first node and a portion of the transistor that represents a cathode is electrically coupled to the third node and wherein the transistor includes a gate that is coupled to the temperature-dependant control signal from the thermal sensing circuit, the transistor being biased so that current is allowed to flow from the third node to the first node when the temperature-dependant control signal has a first value and so that current is not allowed to flow from the third node to the first node when the temperature-dependant control signal has a second value, different from the first value.

* * * * *